(12) United States Patent
Baus et al.

(10) Patent No.: US 11,310,886 B2
(45) Date of Patent: Apr. 19, 2022

(54) CONFIGURATION OF LIGHTING SYSTEMS

(71) Applicant: SIGNIFY HOLDING B.V., Eindhoven (NL)

(72) Inventors: Deborah Baus, Peachtree City, GA (US); Michael Alan Lunn, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 133 days.

(21) Appl. No.: 16/735,404

(22) Filed: Jan. 6, 2020

(65) Prior Publication Data
US 2020/0146133 A1  May 7, 2020

Related U.S. Application Data

(63) Continuation of application No. 15/468,511, filed on Mar. 24, 2017, now Pat. No. 10,531,543.

(51) Int. Cl.
| | |
|---|---|
| *H05B 47/11* | (2020.01) |
| *H05B 47/19* | (2020.01) |
| *H05B 47/115* | (2020.01) |
| *G06F 3/0482* | (2013.01) |
| *G06F 3/0486* | (2013.01) |

(52) U.S. Cl.
CPC .......... *H05B 47/11* (2020.01); *G06F 3/0482* (2013.01); *H05B 47/115* (2020.01); *H05B 47/19* (2020.01); *G06F 3/0486* (2013.01); *Y02B 20/40* (2013.01)

(58) Field of Classification Search
CPC ........ H05B 47/19; G06F 3/0482; Y02B 20/40
See application file for complete search history.

(56) References Cited

U.S. PATENT DOCUMENTS

| | | | | |
|---|---|---|---|---|
| 7,761,260 | B2* | 7/2010 | Walters | H04L 67/18 |
| | | | | 702/183 |
| 9,113,528 | B2* | 8/2015 | Bora | H05B 45/22 |
| 9,374,874 | B1 | 6/2016 | Ewing | |
| 10,101,716 | B2* | 10/2018 | Kim | H04L 41/0886 |
| 10,339,795 | B2* | 7/2019 | Crafts | H04W 88/08 |
| 10,499,477 | B2* | 12/2019 | Chen | H05B 47/175 |
| 10,524,335 | B1* | 12/2019 | Thorington | H05B 47/19 |
| 10,778,330 | B1* | 9/2020 | Zoller | H04B 10/1149 |
| 10,859,988 | B2* | 12/2020 | Slupik | H04W 4/38 |

(Continued)

OTHER PUBLICATIONS

European Search Report for EP 18162798.5 dated Jul. 10, 2018.

*Primary Examiner* — Amy Cohen Johnson
*Assistant Examiner* — Jianzi Chen

(57) ABSTRACT

A configurable lighting system includes a coordinator device and a first lighting device that wirelessly communicates with the coordinator device. The system further includes a user device having a display interface that displays representations of multiple lighting devices including a representation of the first lighting device. The user device is configured to indicate the representation of the first lighting device in the display interface in response to a first user input received at the first lighting device. In response to a second user input received at the user device, the second user input associating the representation of the first lighting device with a zone of a physical area, the coordinator device associates the first lighting device with a second lighting device associated with the zone of the physical area.

20 Claims, 7 Drawing Sheets

(56) References Cited

U.S. PATENT DOCUMENTS

| | | | |
|---|---|---|---|
| 2007/0273307 A1* | 11/2007 | Westrick | H05B 47/115 |
| | | | 315/312 |
| 2012/0143383 A1* | 6/2012 | Cooperrider | H02J 13/0079 |
| | | | 700/295 |
| 2012/0203841 A1 | 8/2012 | Cavalcanti | |
| 2013/0181614 A1* | 7/2013 | Agrawal | G06F 16/444 |
| | | | 315/153 |
| 2014/0001977 A1* | 1/2014 | Zacharchuk | H02J 3/14 |
| | | | 315/291 |
| 2015/0220428 A1 | 8/2015 | Simonyi | |
| 2016/0227020 A1* | 8/2016 | Tadayon | H04W 4/02 |
| 2016/0330819 A1 | 11/2016 | Leadford | |
| 2016/0381767 A1 | 12/2016 | Tiberi | |
| 2017/0041886 A1* | 2/2017 | Baker | H04W 4/33 |
| 2017/0079079 A1* | 3/2017 | Pathuri | H04W 8/26 |

\* cited by examiner

CONFIGURATION OF LIGHTING SYSTEMS

CROSS REFERENCE TO RELATED APPLICATIONS

The present application is a continuation application of and claims priority to U.S. Nonprovisional patent application Ser. No. 15/468,511 filed Mar. 24, 2017 and titled "Configuration Of Lighting Systems." The entire content of the preceding application is incorporated herein by reference.

TECHNICAL FIELD

The present disclosure relates generally to lighting control systems, and more particularly to configuration of lighting systems.

BACKGROUND

After lighting devices such as lighting fixtures, wall stations, sensors, receptacles, etc. are installed in a building, the lighting control system may need to be configured. In some applications, the lighting control system needs to comply with an energy code (e.g., ASHRAE standard) applicable to the area of control. Typical large-scale lighting control systems require several set up steps to comply with an energy code such as an ASHRAE standard. The knowledge required to successfully configure a large-scale lighting control system may generally be beyond that of a construction contractor, and typically, factory-trained technicians are needed to configure large-scale lighting control systems. Thus, a solution that simplifies the configuration of lighting control systems is desirable.

SUMMARY

The present disclosure relates generally to lighting control systems, and more particularly to configuration of lighting control systems. In an example embodiment, a configurable lighting system includes a coordinator device and a first lighting device that wirelessly communicates with the coordinator device. The system further includes a user device having a display interface that displays representations of multiple lighting devices including a representation of the first lighting device. The user device is configured to indicate the representation of the first lighting device in the display interface in response to a first user input received at the first lighting device. In response to a second user input received at the user device, the second user input associating the representation of the first lighting device with a zone of a physical area, the coordinator device associates the first lighting device with a second lighting device associated with the zone of the physical area.

In another example embodiment, a method of commissioning a lighting system includes indicating on the display interface of a user device a representation of a first lighting device in response to a first user input received at the first lighting device. The method further includes receiving a second user input at the user device, the second user input associating the representation of the first lighting device with a representation of a zone of a physical area, and associating by a coordinator device, in response to the second user input received at the user device, the first lighting device with a second lighting device associated with the zone of the physical area. The first lighting device and the second lighting device are configured to wirelessly communicate with the coordinator device.

In another example embodiment, a method of commissioning a lighting system includes creating, by a user device, a representation of a zone of a physical area in response to a first user input to the user device to create a representation of the physical area. The method further includes receiving a second user input at a first lighting device, and indicating, by the user device on the display interface of the user device, a representation of the first lighting device in response to the first user input received at the first lighting device. The method also includes receiving a third user input at the user device, the third user input associating the representation of the first lighting device with the representation of the zone of the physical area, and associating by a coordinator device, in response to the third user input received at the user device, the first lighting device with a second lighting device associated with the zone of the physical area, wherein the first lighting device and the second lighting device are configured to wirelessly communicate with the coordinator device.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
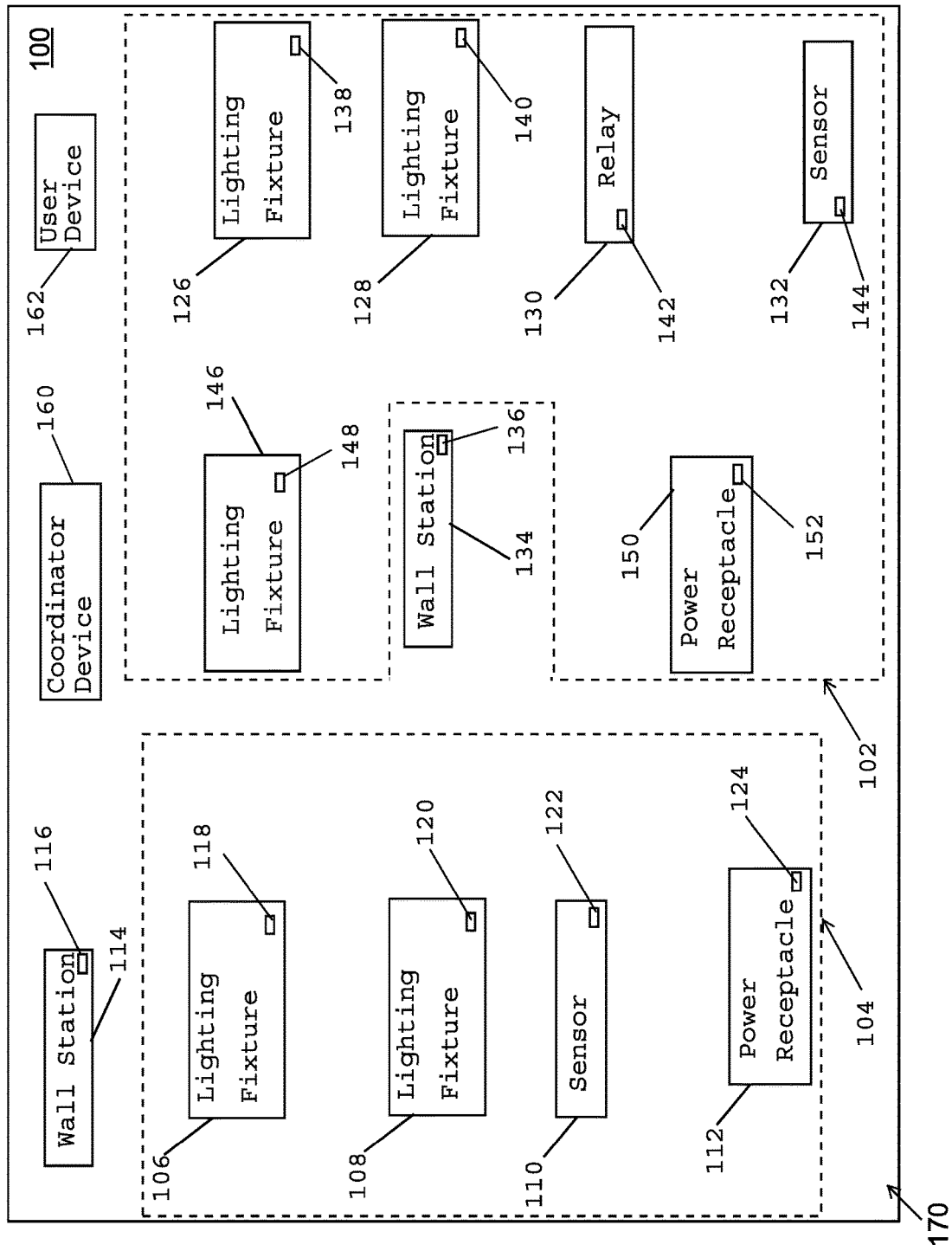
FIG. 1 illustrates a lighting system according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a lighting system 100 according to an example embodiment. As illustrated in FIG. 1, the lighting system 100 may include a number of wired and/or wireless lighting devices, a coordinator device 160, and a wireless user device 162. The coordinator device 160 may be a wireless device, a wired device that is coupled by a communication cable to a wireless device such as, for example, a wireless network router, or a device that otherwise communicates with wireless devices. The user device 162 may be a wireless device that can communicate with the coordinator device 160, either directly or through a wireless network router or another device. For example, the user device 162 may be a mobile phone or a tablet. The wireless lighting devices of the lighting system 100 may communicate with the coordinator device 160 in a similar manner. For example, communication between the lighting devices and with the user device 162 may occur through the coordinator device 160.

In some example embodiments, the lighting devices/fixtures 106, 108, 126, 128, 146 may be ceiling recessed or other types of lighting fixtures that include one or more light sources (e.g., LED light sources) that emit light. The lighting devices 106, 108, 126, 128, 146 may include one or more integrated sensors 118, 120, 138, 140, 148. For example, the lighting device 106 includes the sensor 118, the lighting device 108 includes the sensor 120, the lighting device 126 includes the sensor 138, the lighting device 128 includes the sensor 140, and the lighting device 146 includes the sensor 148. The sensors 118, 120, 138, 140, 148 may be wireless sensors or may communicate wirelessly through wireless communication circuitry of the respective lighting fixture 106, 108, 126, 128, 146. In some example embodiments, the sensors 118, 120, 138, 140, 148 may each include a daylight sensor, a motion sensor, temperature sensor, camera, and/or another type of sensor or a combination thereof.

In some example embodiments, shining a light into any one of the sensors 118, 120, 138, 140, 148 may cause the respective lighting fixture 106, 108, 126, 128, or 146 to transmit information identifying the particular lighting fixture. The identifying information may be sent by the lighting fixture along with an indication that a user input was provided to the particular lighting fixture. For example, if a user shines a light (e.g., a light from a flash light) into the sensor 118, the lighting fixture 106 may wirelessly transmit information identifying the lighting fixture 106. Alternatively, the sensor 118 may wirelessly transmit the information identifying the lighting fixture 106. The information identifying the lighting fixture 106 may be a serial number or other data of the lighting fixture 106, a wireless network address of the lighting fixture 106, or other identification information that uniquely identifies the lighting fixture 106 from the other lighting devices of the lighting system 100. The other lighting fixtures 108, 126, 128, 146 and the integrated sensors 120, 138, 140, 148 may operate in a similar manner as the lighting fixture 106 and the sensor 118 in response to a light being shined on the sensors 108, 126, 128, 146. In some alternative embodiments, the lighting fixtures 106, 108, 126, 128, 146 and/or the sensors 118, 120, 138, 140, 148 may include a button and may wirelessly transmit identifying information in response to the pressing of the button. Alternatively, a means other than shining a light and pressing a button may be used to cause the transmission of identifying information by the lighting fixtures 106, 108, 126, 128, 146 and/or the sensors 118, 120, 138, 140, 148. In some alternative example embodiments, one or more of the lighting fixtures 106, 108, 126, 128, 146 may not include a sensor or another means of providing an input to initiate transmission of identifying information.

In some example embodiments, the lighting system 100 may also include standalone wireless sensors 110, 132. For example, the sensors 110, 132 may be wireless tile mounted sensors or wireless ceiling sensors. The sensors 110, 132 may each include a daylight sensor, a motion sensor, and/or another type of sensor. The sensor 110 may include a button 122, and the sensor 132 may include a button 144. To illustrate, pressing the button 122 may result in the sensor 110 wirelessly transmitting information identifying the sensor 110. The identifying information may be sent along with an indication that a user input was provided to the particular sensor. For example, the information identifying the sensor 110 may be a serial number of the sensor 110, a wireless network address of the sensor 110, or other identification information that uniquely identifies the sensor 110 from the other lighting devices of the lighting system 100. In some alternative embodiments, a means other than pressing a button may be used to cause the transmission of identifying information by the sensors 110, 132.

In some example embodiments, the lighting system 100 may include wireless power receptacles 112, 152 that are wirelessly controllable. For example, the power receptacles 112, 152 may be wall mounted receptacles. The power receptacle 112 may include a button 124, and the power receptacle 150 may include a button 144. Pressing the button 124 may result in the power receptacle 112 wirelessly transmitting identifying information such as, for example, serial number, network address, etc. of the power receptacle 112. Pressing the button 144 may result in the power receptacle 132 wirelessly transmitting identifying information such as, for example, serial number, network address, etc. of the power receptacle 132. The identifying information may be sent along with an indication that a user input was provided to the particular power receptacle.

In some example embodiments, the lighting system 100 may include a wireless relay 130 that includes a sensor 142. The relay 130 may be a dimming relay (e.g., a 20 A dimmable relay). For example, the relay 130 may be a 0-10V dimming relay. Shining a light into the sensor 142 may result in the relay 130 wirelessly transmitting identifying information such as, for example, serial number, network address, etc. of the relay 130. Alternatively, the relay 130 may include a button instead of a sensor 142, and pressing the button may result in the relay 130 wirelessly transmitting the identifying information. The identifying information may be sent along with an indication that a user input was provided to the relay 130.

In some example embodiments, the lighting system 100 may include wall stations 114, 134. The wall station 114 may include a button 116, and the wall station 134 may include a button 136. Pressing the button 116 may result in the wall station 114 wirelessly transmitting identifying information such as, for example, serial number, network address, etc. of the wall station 114. Pressing the button 136 may result in the wall station 134 wirelessly transmitting identifying information such as, for example, serial number, network address, etc. of the wall station 134. The identifying information may be sent along with an indication that a user input was provided to the particular wall station.

The wall stations 114, 134 may be configured to control other lighting devices of the lighting system 100. For example, the wall station 114 may be configured to control the lighting fixtures 106, 108 and the power receptacle 112, and the wall station 134 may be configured to control the lighting fixtures 126, 128, 146, the relay 130, and the power receptacle 150. To illustrate, the wall station 114 may communicate with the lighting fixtures 106, 108 and the power receptacle 112 through the coordinator device 160. For example, the wall station 114 may wirelessly send a control message (e.g., a light off command) to control the lighting fixture 106 by sending the message to the coordinator device 160, which may retransmit the message or process the message and send a corresponding message to the lighting fixture 106. In some example embodiments, two or more wall stations may be configured to control the same lighting device. The wireless communication among the devices of the lighting system 100 may be accomplished with wireless transceivers of the devices as known to those of ordinary skill in the art and may be compliant with a wireless communication standard such as, for example, Wi-Fi, Bluetooth, Thread, ZigBee, or a proprietary communication standard.

In some example embodiments, the lighting devices of the lighting system 100 may be on single floor of a building or spread across multiple floors. For example, the lighting system 100 may be in an area 170 such as a single room (e.g., a hall) of a building. Alternatively, the lighting devices of the lighting system 100 may be in multiple rooms, where each room is considered an area.

In some example embodiments, the lighting devices of the lighting system 100 may be placed in/associated with two or more zones 102, 104 to group the lighting devices for the purpose of control. For example, the lighting fixtures 106, 108, the sensor 110, and the receptacle 112 may be preferred to be in/associated with the zone 104 of the area 170, and the lighting fixtures 126, 128, 146, the relay 130, the sensor 132, and the receptacle 150 may be preferred to be in/associated with the zone 102 of the area 170. The wall station 114 may be associated with the zone 104 to control the lighting fixture 106, the lighting fixture 108, and the power receptacle 112, and the wall station 134 may be associated with the zone 102 to control the lighting fixtures 126, 128, 146, the relay 130, and the power receptacle 150. Each zone 102, 104 may also have an occupancy set that includes integrated sensors and/or standalone sensors that are grouped together such that a lighting fixture (e.g., the lighting fixture 106), a power receptacle (e.g., the power receptacle 112) and/or another lighting device are controlled based on motion detection by any one of the sensors in the occupancy set associated with the zone. The configuration of the lighting system 100 to associate the lighting devices of the lighting system 100 with the zones and/or another lighting device of the lighting system 100 is performed with the use of the user device 162 as described below.

In some example embodiments, the identification information of the lighting devices of the lighting system 100 may be stored on the user device 162 or may be retrievable from the coordinator device 160 or from another device. For example, the identification information of the lighting devices may be obtained by the coordinator device 160 in a manner described in U.S. Provisional Patent Application 62/323,233, the entire content of which is incorporated herein by reference. Alternatively, the identification information of the lighting devices may be obtained and stored in the coordinator device 160 or the user device 162 using other means as may be contemplated by those of ordinary skill in the art with the benefit of this disclosure.

Figure 2:
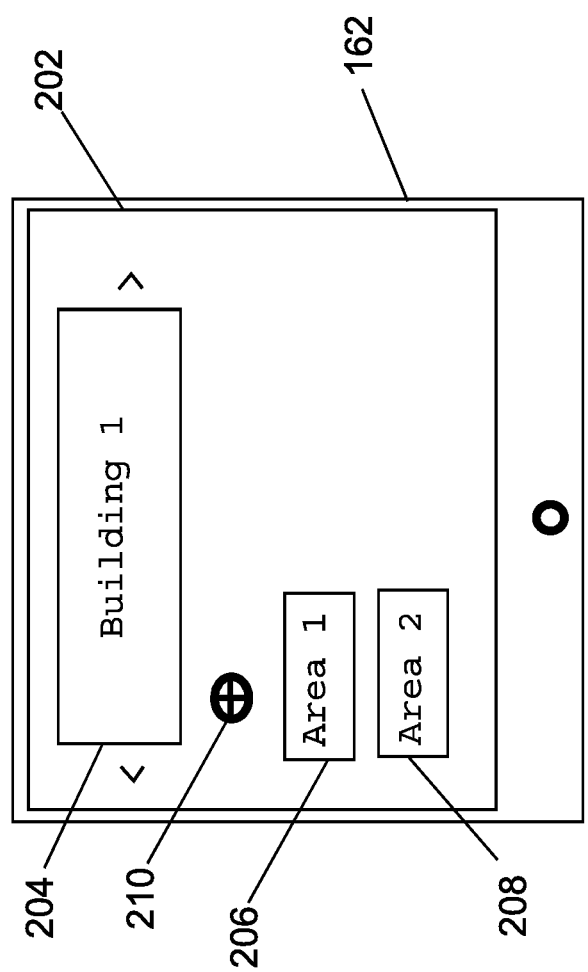
FIG. 2 illustrates a display interface of a user device displaying representations of physical areas according to an example embodiment.

During operations to configure the lighting system 100, a user may provide an input to the user device 162 to create a representation of the area 170. For example, the user device 162 may be a mobile phone or another mobile device that includes a display interface and an application/software that enables configuration of the light system 100. The user input may be provided, for example, via a touch sensitive display interface of the user device 162 or via keyboard entry. FIG. 2 illustrates a display interface 202 of the user device 162 displaying representations of physical areas according to an example embodiment. Referring to FIGS. 1 and 2, the area representation 208 may, for example, represent the physical area 170. For example, the user may touch an icon 210 on the display interface 202 for the user device 162 to create a new representation of an area. In FIG. 2, the representation 206 may have been created after or before the creation of the representation 208 and may be intended to correspond to a different area (e.g., a room) in the same building that houses the area 170.

Figure 3:
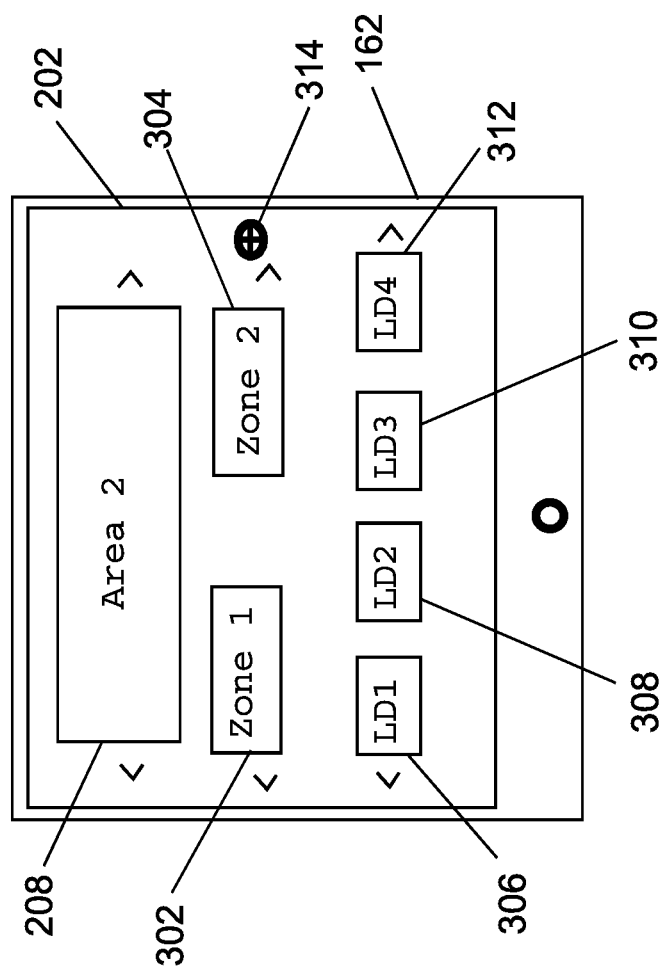
FIG. 3 illustrates a display interface of a user device displaying representations of an area, zones associated with the area, and lighting devices of the system of FIG. 1 according to an example embodiment.

In some example embodiments, in response to the user input to create the representation of the area 170, the user device 162 may create default representations of zones of the area 170. For example, the user device 162 may by default create two representations of the zones associated with the representation 208 of the area. FIG. 3 illustrates the display interface 202 of the user device 162 displaying representations of the area 170, zones associated with the area, and lighting devices of the system 100 according to an example embodiment. Referring to FIGS. 1-3, the representations 302, 304 may be created by the user device 162 in response to the user input to create the representation 208 of the area 170. To illustrate, the representation 302 may correspond to the zone 102 of the area 170, and the representation 304 may correspond to the zone 104 of the area 170. In some alternative embodiments, the creation of the representations of the zones may be omitted, and the configuration operations may continue with respect to the representation 208 of the area 170. Further, additional representations of zones may be created by providing a user input to the user device 162, for example, by touching an icon 314 on the display interface 202. A user may also delete one or more representations of the zones displayed on the display interface 202.

As illustrated in FIG. 3, representations of some of the lighting devices of the lighting system 100 may also be displayed on the display interface 202 of the user device 162. For example, the representations 306, 308, 310, 312 may correspond to lighting devices of the lighting system 100. To illustrate, the representations 306, 308, 310, 312 may be associated with the identification information of particular lighting devices of the lighting system 100. For example, the representation 306 in FIG. 3 may correspond to the lighting fixture 126 in FIG. 1. As another example, the representation 310 in FIG. 3 may correspond to the wall station 134 in FIG. 1. As another example, the representation 308 in FIG. 3 may correspond to the lighting fixture 106 in FIG. 1.

When a user presses the button 136 on the wall station 134, the wall station 134 may wirelessly transmit identification information to the user device 162, for example, through the coordinator device 160. In response, the user device 162 may indicate the representation 310 from among the other representations, for example, by flashing the representation 310, changing the color of the representation 310, changing the boundary of the representation 310, and/or moving the representation 310 first in the display order of the representations, or by otherwise displaying an indication that identification information of the wall station 134 is received by the user device 162. For example, FIG.

4 illustrates the display interface 202 of the user device 162 displaying representations of lighting devices of the lighting system 100 after a user input is provided to the wall station 134 according to an example embodiment.

Figure 4:
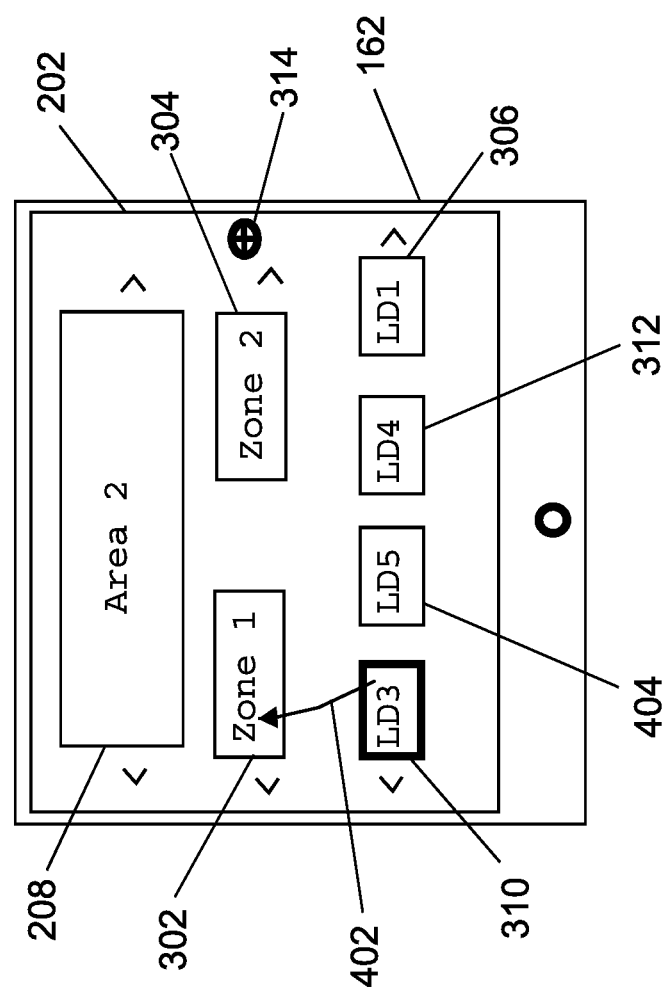
FIG. 4 illustrates a display interface of a user device displaying representations of lighting devices of the lighting system of FIG. 1 after a user input is provided to a lighting device according to an example embodiment.

Referring to FIGS. 1-4, the representation 310 corresponding to the wall station 134 may be displayed first in the order of representations, as shown in FIG. 4, to indicate that a user input has been provided to the wall station 134, in this example embodiment, by pressing the button 136. The perimeter of the representation 310 may also be highlighted to further distinguish the representation 310 from the other displayed representations. The user can move (e.g., by dragging and dropping) or otherwise associate the representation 310 to the representation 302, which corresponds to the zone 102, as shown by the arrow 402. In response, the user device 162 may transmit information to the coordinator device 160 indicating the association of the wall station 134 with the zone 102. If one or more other representations of one or more lighting devices (e.g., the lighting fixture 146) had previously been moved to the representation 302, the coordinator device 160 may automatically (i.e., without further user input) associate the wall station 134 with the one or more other lighting devices such that the wall station 134 can control the other lighting devices. Further, when one or more representations of one or more lighting devices (e.g., the lighting fixture 126) are subsequently moved to or otherwise associated with the representation 302, the coordinator device 160 may automatically associate the wall station 134 with the other lighting devices such that the wall station 134 can be used to control the other lighting devices.

In some example embodiments, the user device 162 may no longer display representations of lighting devices that have already been associated with zones among available representations of lighting devices. Alternatively, the user device 162 may provide separate display areas for displaying representations of lighting devices that have been associated with zones and those that have not been associated with zones, or may otherwise display them differently. The user device 162 may continue to indicate/identify a lighting device that has already been associated with a zone if the user provides an input (e.g., press a button on the lighting device). After the associating of a particular wall station (e.g., the wall station 134) with one or more zones (e.g., the zone 102), the wall station may control scenes and other virtual entities based on default settings stored in the wall station or the coordinator device. For example, the wall station 134 may control dim levels, color temperatures, and/or colors of lights emitted by the lighting fixtures in the zone 102 based on default settings without requiring a manual configuration by a user.

In general, other lighting devices of the lighting system 100 may be associated with the zone 102 or the zone 104 in a similar manner. For example, the user may shine/flash a light into the sensor 132 resulting in the representation corresponding to the sensor 132 on the display interface 202 being indicated/identified (e.g., moved to first in order, highlighted, etc.). Once the representation is indicated/identified on the user device 162, the user can move the indicated/identified representation corresponding to the sensor 132 to the representation 302 of the zone 102. In response, the user device 162 may transmit information to the coordinator device 160, for example, indicating the association of the sensor 132 with the zone 102. The coordinator device 160 may associate with the wall station 134 all lighting devices that are controllable by the wall station 134 and that have their corresponding representations moved to or otherwise associated with the representation 302 (e.g., by dragging and dropping using a finger, a mouse, etc., by selecting from a menu, and/or by keyboard entry) on the display interface 202.

As another example, the user may shine/flash a light into the sensor 118 of the lighting fixture 106 resulting in the representation corresponding to the lighting fixture 106 on the display interface 202 being indicated/identified (e.g., moved to first in order, highlighted, etc.). Once identified, the user can move the indicated/identified representation corresponding to the lighting fixture 106 to the representation 304 of the zone 104. In response, the user device 162 may transmit information to the coordinator device 160, for example, indicating the association of the lighting fixture 106 with the zone 104. When a representation of the wall station 114 is moved to or otherwise associated with the representation 304 of the zone 104 by the user, the coordinator device 160 may associate with the wall station 114 lighting devices that have corresponding representations moved to or otherwise associated with the representation 304 such that the wall station 114 can be used to control the lighting devices.

In some example embodiments, the coordinator device 160 may examine the strength of the wireless signals transmitted by the lighting devices to identify lighting devices that should be included in a particular zone. To illustrate, when the user presses the button 136 on the wall station 134, the coordinator device 160 may identify a number (e.g., ten) of the lighting devices of the lighting system 100 that are within the particular distance (e.g., 10 feet) of the wall station 134 by comparing the signal strengths of the signals from the lighting devices as well as the signal from the wall station 134. For example, in FIG. 4, a representation 404 of a lighting device is moved next to the representation 310 of the wall station 134 after the button 136 on the wall station 134 is pressed by the user. To illustrate, the representation 404 may correspond to the lighting fixture 128. Further, the representation 312 is moved to the left relative to its location in FIG. 3, for example, to indicate that the lighting fixture corresponding to the representation 312 is closer to the wall station 134 than other lighting devices except for lighting fixture 128. Alternatively, other lighting devices that are within a particular range of the wall station 134 may be indicated by the user device 162 in a different manner without departing from the scope of this disclosure.

In some example embodiments, when the user flashes a light on a sensor of a lighting device (e.g., the sensor 120 of the lighting fixture 108), presses a button on the lighting device, or otherwise provides an input to the lighting device such that the representation of the lighting device is identified on the user device 162, the coordinator device 160 may identify a number (e.g., twenty) of the lighting devices of the lighting system 100 that emit signals having signal strengths that are within a range that includes the signal strength of the signal received by the coordinator device 160 from the particular lighting device (e.g., plus and minus 20% of the signal received by the coordinator device 160 from the particular lighting device). For example, the boundaries of the signal strength range may be stored in the coordinator device 160, for example, as a percentage of signal strength of the signal from the lighting device. The lighting devices identified by the coordinator device 160 may be indicated on the user device 162, for example, by displaying the corresponding representations ahead of representations of other lighting devices or by other means as contemplated by those of ordinary skill in the art with the benefit of this disclosure. When the user provides an input (e.g., by pressing a button) to a second lighting device of the lighting system 100, particular lighting devices that transmit wireless signals having signal strengths that fall within a range bound by the signal strengths of the signals from the first lighting device and the second lighting device may be identified by the coordinator device 160 and displayed on the user device 162 in a manner that distinguishes the particular lighting devices from other lighting devices. Alternatively, the signal strength range may be set based on a range that includes the signal strength of the signal from the second lighting device or based on another parameter as may be contemplated by those of ordinary skill in the art with the benefit of this disclosure. As the user provides input to other lighting devices, the signal strength ranges may be set in a similar manner.

As user input is provided (e.g., shining a light or pressing a button) to more lighting devices that are intended to be in a particular zone, one or more other lighting devices that should also be in the same zone may become clearer based on the display/identification of corresponding representations of the lighting devices on the user device 162. For example, the relay 130 may be behind a ceiling, and thus may present a challenge to shine a light into the sensor 142 or press a button on the relay 130 so that the relay 130 can transmit identification information. The representation of the relay 130 on the display interface 202 may repeatedly appear next to the representations of other lighting devices in the zone 102 when a user input (e.g., shining a light or pressing a button) is provided to the lighting devices. For example, because of the proximity of the relay 130 to the lighting fixture 128, the sensor 132, and the receptacle 150, the representation of the relay 130 may appear on the user device 162 next to the representation of the lighting fixture 128, the representation of the sensor 132, and the representation of the receptacle 150, when the user input is provided to these lighting devices in order. Based on the repeated identification of the representation of the relay 130, the user device 162 or the user may determine that the relay 130 should be in the same zone as the lighting fixture 128, the sensor 132, and the receptacle 150. The user may move the representation on the relay 130 to the representation 302 of the zone 102 to associate the relay 130 with the zone 102. In some example embodiments, a particular lighting device may be identified as a lighting device that should be in or associated with a particular zone without necessarily being repeatedly identified.

In some example embodiments, instead of or in addition to the user providing an input to the lighting devices, the user may select or indicate a representation of a lighting device on the user device 162 and the corresponding lighting device may provide an indication (e.g., flashing a light, changing color of the light, etc.). The user may identify the particular lighting device that corresponds to the selected representation by looking for the indication such as the flashing of the light emitted by the lighting device. For example, the lighting fixture 108 may flash its light and/or change a color of its light, etc. in response to the user selecting a representation, which, unknown to the user at the time of the selection, corresponds to the lighting fixture 108 on the user device 162. The user may select the representation on the user device 162 by selecting the representation with a finger or a cursor, based on a menu item selection, etc. The user device 162 may transmit information identifying the lighting device 108 when the user selects the representation corresponding to the lighting device 108. As another example, a device that is plugged into the power receptacle 150 may flash a light emitted by the device in response to the user selecting a representation of the power receptacle 150 on the user device 162. As yet another example, the relay 130 may flash a light in response to the user selecting a representation of the relay 130 on the user device 162.

When the user identifies a particular lighting device that corresponds to a selected representation, the user may move or otherwise associate the representation of the lighting device on the user device 162 with the representation of the desired zone in a similar manner as described above. In some example embodiments, one or more of the lighting devices of the system 100 (for example, one or more of the lighting fixtures 106, 108, 126, 128, 146, the relay 130, and/or the power receptacles 112, 150) may not include a sensor or another means (e.g., a button) for providing an input to initiate transmission of identifying information from the lighting device to the user device 162. Such lighting devices may be associated with a desired zone by selecting representations on the user device 162, finding the corresponding devices, and moving/associating the representations to/with a representation of the desired zone.

In some example embodiments, the coordinator device 160 may include a memory device to store one or more operation codes such as an energy code. After the associating of lighting devices with zones based on the association of the representations of the lighting devices with the representations of the zones, the coordinator device 160 may automatically apply an operation code (e.g., ASHRAE code) to the lighting devices in the zones 102, 104. The coordinator device 160 may also apply other constraints and configurations that may be applicable to all zones or to specific zones. For example, by default, the coordinator device 160 may associate all sensors—integrated or standalone—in the zone 102 with an occupancy set such that, for example, one or more lighting fixtures, receptacles, and relays in the zone 102 are controlled based on each one of the sensors in the zone 102.

To illustrate, the sensors in each zone 102, 104 may be automatically grouped together to provide a first ON-last OFF operation after the sensors are associated with the particular zone by associating respective representations in the user device 162 as described above. Alternatively, a subset of the sensors in each zone 102, 104 may be included with the occupancy set of the particular zone. In some example embodiments, the coordinator device 160 may apply some settings to some sensors upon the association of the sensors with a particular zone as described above. The coordinator device 160 may also apply settings such as default dim levels, default on or off state, etc. to the lighting devices associated with a zone such as the zone 102. For example, the power receptacle 150 may be turned on immediately upon motion detection by the sensors and turned off when motion is undetected for a relatively short period. As another example, the dominant button of the wall stations 114, 134 may be programmed to trigger a 50% lighting level, resulting in even more energy efficiency.

In some example embodiments, code compliant operations of the lighting system 100 and application of other constraints and settings may be controlled by the wall stations 114, 134, for example, with the support of the coordinator device 160, instead of being controlled by the coordinator device 160.

In some example embodiments, the user device 162 may determine the geographic location of the user device 162 and provide the information to the coordinator device 160. For example, the user device 162 may use a global positioning system (GPS) application installed in the user device 162 to determine the geographic location. The coordinator device 160 may use the location information to select an energy code or another operation code that meets the requirements of, for example, the municipality, at the location. To illustrate, the default energy code may allow lights to remain on for twenty minutes after the detection of a motion by motions sensors of the lighting system 100. On the other hand, the applicable municipality code may require that lights are turned off if no motion is detected for ten minutes. In such an example case, the coordinator device 160 may automatically use an energy code that satisfies the energy requirements of the municipality to control operations of the lighting devices of the lighting system 100.

In some example embodiments, the coordinator device 160 or the user device 162 may provide a warning to the user, for example, when a selected operation code (e.g., energy code) does not meet requirements for the geographic location indicated by the user device 162. In response, the user may choose to select, for example, a different energy code to be compliant with applicable requirements for the geographic location.

Configuring lighting devices of a lighting system, such as the lighting system 100, as described herein significantly simplifies the configuration of the lighting system and enables the lighting system to be quickly operational in compliance with required codes. For example, a person who is not a factory-trained technician may be able to perform commissioning of a lighting system such as the lighting system 100, for example, during construction or renovation of a building. Field service technicians may also save a significant amount of time during commissioning of lighting systems.

Although the association of display representations of lighting devices is described with respect to zones, in some alternative embodiments, lighting devices may be associated with an area instead of zones without departing from the scope of this disclosure. For example, lighting devices of a lighting system in a physical area that does not have multiple zones may be configured with respect to the area instead of zones. Further, a display representation of lighting devices may first be associated with a display representation of an area (e.g., by dragging and dropping or multi-selecting and moving the representations of the lighting devices to the representation of the area) before being associated with representations of zones. The above description with respect to one zone (e.g., zone 102) may be equally applicable to other zones (e.g., zone 104) without departing from the scope of this disclosure.

Although a particular number of lighting devices are shown in FIG. 1, in alternative embodiments, the system 100 may include more or fewer lighting devices than shown. The lighting system 100 may for example include up to hundreds of lighting devices. In some example embodiments, the lighting system 100 may include other types of lighting devices than shown in FIG. 1. Although only two zones are shown in FIG. 1, in alternative embodiments, the lighting devices of the lighting system 100 may be categorized in more or fewer zones. In some alternative embodiments, the representations of the areas and zones displayed on the user device 162 may have a different appearance than that shown in FIG. 1. Further, the representations of the areas, the zones, and lighting devices of the lighting system 100 displayed in the display interface 202 may have different appearances (e.g., shape, size, placement, etc.) without departing from the scope of this disclosure. For example, the representations 206, 208, 302-314 may simply be a different shape frame with text, text only, or may have another format without departing from the scope of this disclosure. In general, the coordinator device 160 and the user device 162 communicate with each other wirelessly, directly or indirectly, as necessary to provide information needed by the other device. In some example embodiments, the system 100 may include one or more lighting devices that are not wireless. For example, the system 100 may include one or more lighting devices that are connected, directly or indirectly, with the coordinator device 160 via one or more cables. In some example embodiments, one or more of the lighting devices of the system 100 may capable of communicating with the coordinator device 160 wirelessly as well as via a wired connection.

Figure 5:
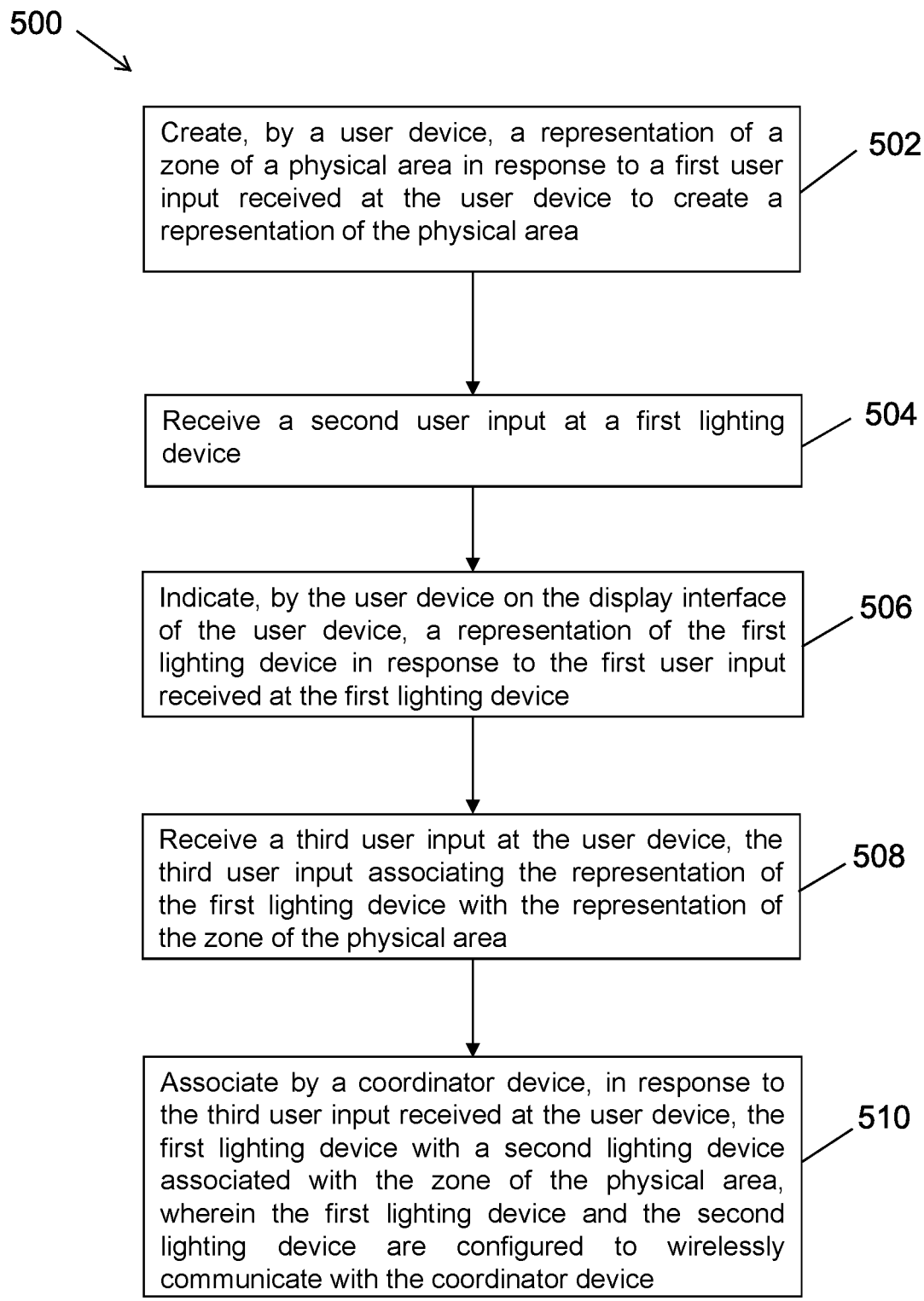
FIG. 5 illustrates a method for configuring the system of FIG. 1 according to an example embodiment.

FIG. 5 illustrates a method 500 for configuring the system 100 of FIG. 1 according to an example embodiment. Referring to FIGS. 1-5, at step 502, the method 500 includes creating, by the user device 162, a representation of a zone of a physical area in response to a first user input to the user device to create a representation of the physical area. For example, the user device 162 may create the representation 302 of the zone 102 of the physical area 170 in response to a user input to the user device 162 to create the representation 204 of the physical area 170. The user device 162 may also create the representation 304 of the zone 102 of the physical area 170 in response to the same user input to the user device 162 to create the representation 204 of the physical area 170. For example, the user may provide the user input by touching the icon 210.

At step 504, the method 500 includes receiving, from the user, a second user input at (i.e., received by) a first lighting device. For example, the user may push a button on the lighting fixture 126 or shine a light into the sensor 138. As another example, the user may push the button 136 of the wall station 134 or the button 116 of the wall station 114. At step 506, the method 500 includes indicating, by the user device 162 on the display interface 202 of the user device 162, a representation of the first lighting device in response to the first user input received at (i.e., received by) the first lighting device. For example, the first user input may be communicated from the first lighting device to the user device 162 via the coordinator device 160 and user device 162 may indicate/identify the representation 310, for example, by highlighting the perimeter of the representation 310 in response to the user pushing a button on the corresponding lighting device (e.g., the button 136 of the wall station 134).

At step 508, the method 500 includes receiving a third user input at (i.e., receiving a third user input by) the user device 162 associating the representation 310 of the first lighting device with the representation 302 of the zone 102 of the physical area 170. For example, the user may drag and drop, for example, by touching the display interface 202 with a finger or using a cursor, the representation 310 on the representation 302. The user may drag and drop or otherwise move representations of other lighting devices of the lighting system 100 to the respective representation 302, 304, after the user provides to an input to the lighting devices by pushing a button, shining a light, or other means and the user device 162 indicates/identifies the corresponding representations of the lighting devices.

At step 510, the method 500 includes associating by the coordinator device 160, in response to the third user input received at the user device (e.g., dragging and dropping the representation 310 on the representation 302), the first lighting device (e.g., the lighting fixture 146) with a second lighting device (e.g., the wall station 114) associated with the zone 102 of the physical area 170, where the first lighting device (e.g., the lighting fixture 146) and the second lighting device (e.g., the wall station 114) are configured to wirelessly communicate with the coordinator device 160, directly or indirectly, for example, via a network router or a similar device.

In some example embodiments, the method 500 includes operating the first lighting device (e.g., the lighting fixture 146 or the lighting fixture 128) and the second lighting device (e.g., the wall station 114) in compliance with an energy code (e.g., ASHRAE/Title-24) applied by the coordinator device 160. For example, the coordinator device 160 may have a default code or multiple codes stored in a memory device. It should be understood by those in this field that the coordinator device 160 and the lighting devices described herein can include a hardware processor and one or more memory devices comprising instructions for execution by the hardware processor. The memory devices can comprise volatile or non-volatile computer-readable media.

In some example embodiments, the method 500 includes determining, by the coordinator device 160, whether a first energy code (e.g., a default energy code stored in the coordinator device 160) is in compliance with energy code requirements for a geographic location of the user device determined by the user device. For commissioning purposes, the geographic location of the user device 162 during the commissioning process is considered to be the same as the geographic location of the lighting system 100 and the coordinator device 160. In some alternative embodiments, the coordinator device 160 or another device may determine the geographic location of the lighting system 100 for the purpose of determining whether the default code or a selected code satisfies requirements applicable to the particular location (e.g., municipality). In response to determining that the first energy code is non-compliant with the energy code requirements for the geographic location of the user device 162, the coordinator device 160 may apply a second energy code (i.e., another energy code considered to be compliant to the local requirements) to the first lighting device and the second lighting device. In some example embodiments, the method 500 includes displaying a message on the display interface of the user device if the first energy code (e.g., the default or user selected energy code) is non-compliant with the energy code requirements for the geographic location of the user device. Alternatively, the coordinator device 160 may display the warning. The warning provides the opportunity to select a complaint code.

Although the steps of the method 500 are presented in a particular order, in some alternative embodiments, some of the steps may be performed in a different order than described or may be omitted without departing from the scope of this disclosure. In some example embodiments, user inputs may be provided to the user device 162 using various methods, such as selection from a menu and/or other means described above.

Figure 6:
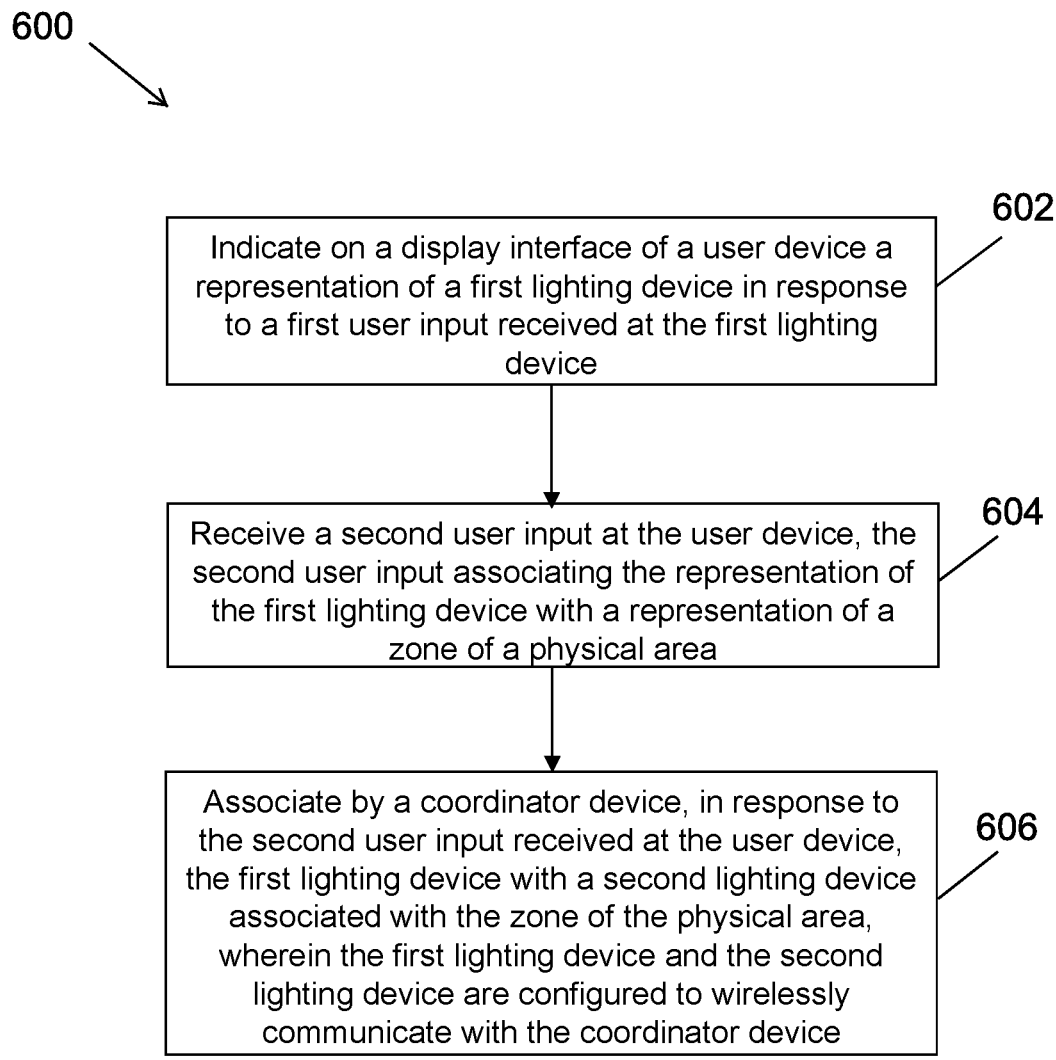
FIG. 6 illustrates a method for configuring the system of FIG. 1 according to another example embodiment.

FIG. 6 illustrates a method 600 for configuring of the system 100 of FIG. 1 according to another example embodiment. Referring to FIGS. 1-4 and 6, in some embodiments, at step 602, the method 600 includes indicating/identifying on the display interface 202 of the user device 162 the representation 310 of a first lighting device (e.g., the sensor 122) in response to a first user input provided to the first lighting device (e.g., the sensor 122). The first user input may be provided by shining a light into the lighting device such as the sensor 122 or pressing a button. The user device 162 may indicate/identify the representation 310 by changing the color, adding a marker, highlighting the perimeter of the representation 310, or by other means.

At step 604, the method 600 includes receiving a second user input at the user device 162 associating the representation 310 of the first lighting device with a representation 302 of the zone 102 of the physical area 170. For example, the user may provide a text entry, check a box, or drag and drop the representation 310 on the representation 302, or use another means to provide an input to the user device 162 to associate the representation 310 of the first lighting device with a representation 302 of the zone 102 of the physical area 170. At step 606, the method 600 includes associating by the coordinator device 160, in response to the second user input (e.g., drag and drop) received at the user device 162, the first lighting device (e.g., the wall station 134) with a second lighting device (e.g., the lighting fixture 126) associated with the zone 102 of the physical area 170. For example, the second lighting device may have been previously associated with the zone 102 by moving the representation of the second lighting device (e.g., the lighting fixture 126) to the representation 302 when the representation of the second lighting device is indicated/identified by the user device 162 in response to a user input (e.g., pressing a button or shining a light) provided to the second lighting device. The first lighting device and the second lighting device are configured to wirelessly communicate with the coordinator device as described above.

In some example embodiments, the method 600 includes operating the first lighting device and the second lighting device in compliance with an energy code applied by the coordinator device in a manner described above.

Although the steps of the method 600 are presented in a particular order, in some alternative embodiments, some of the steps may be performed in a different order than described or may be omitted without departing from the scope of this disclosure. In some example embodiments, user inputs may be provided to the user device 162 using various methods, such as selection from a menu and/or other means described above.

Figure 7:
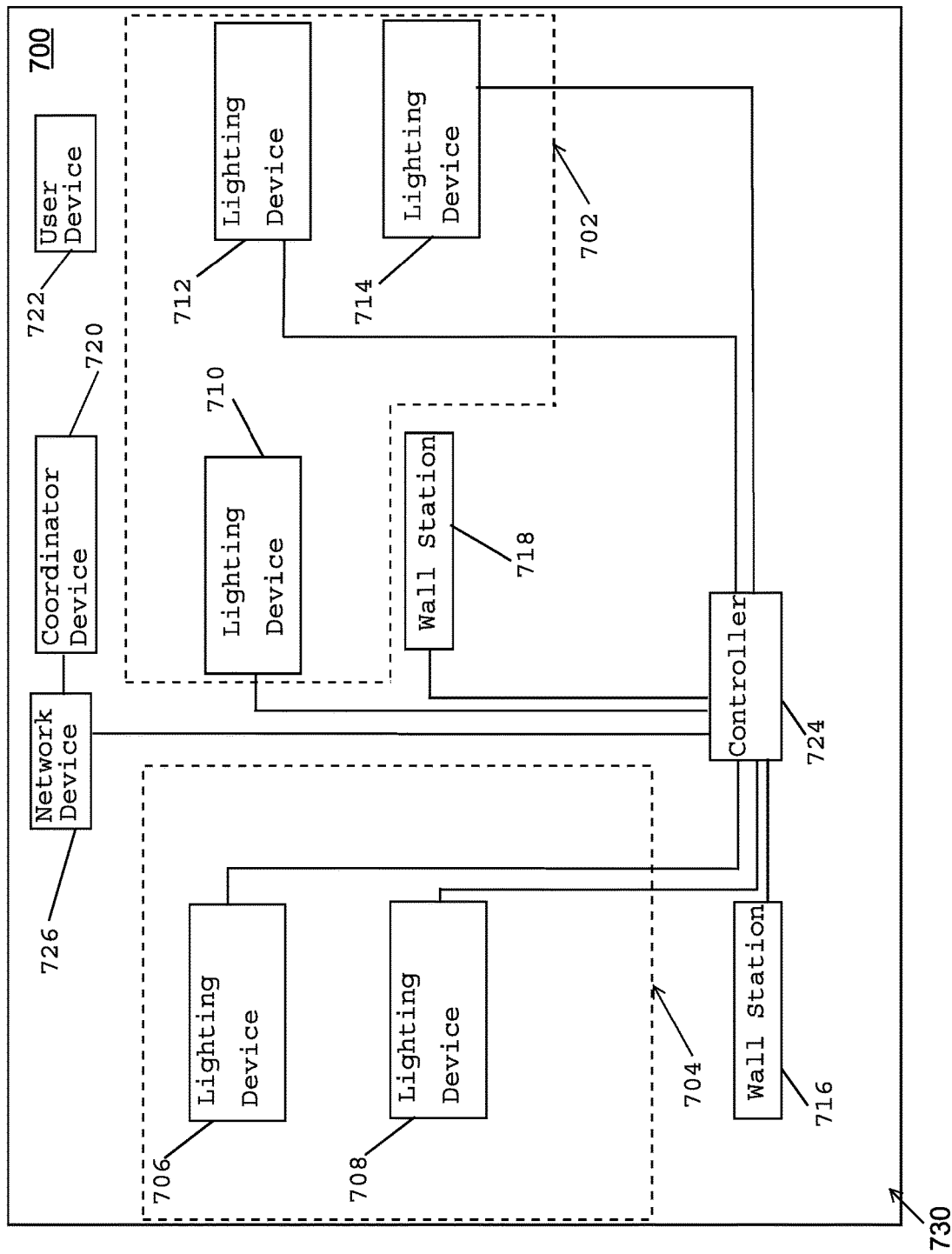
FIG. 7 illustrates a lighting system according to another example embodiment.

FIG. 7 illustrates a lighting system 700 according to another example embodiment. In some example embodiments, the lighting system 700 includes lighting devices similar to those described with respect to the system 100. The lighting devices of the lighting system 700 may be in an area 730 that is zoned into zones 702, 704. The system 700 may include lighting devices 710, 712, 714, and other lighting devices that are in the zone 702, and lighting devices 706, 708, and other lighting devices that are in the zone 704. The system 700 may include a wall station 716 that is associated with the zone 704 to control the lighting devices in the zone 704, and a wall station 718 that is associated with the zone 702 to control the lighting devices in the zone 702.

In some example embodiments, the system 700 may include a controller 724 that is connected to the lighting devices of the lighting system 700 via wired connections. For example, the controller 724 may control some configurations of the lighting devices. To illustrate, the controller 724 may be a DALI controller or another controller. The controller 724 may be connected with a network device 726, such as router via a wired connection, and the network device 726 may be connected to a coordinator device 720 via another wired connection. The coordinator device 720 may communicate with a user device 722 in a similar manner as described above with respect to the coordinator device 160 and the user device 162. In some example embodiments, the coordinator device 720 may be the same as the coordinator device 160, and the user device 722 may be the same as the user device 162 of FIG. 1. For example, the lighting system 700 may be in the same building as the system 100 such that the lighting devices of the lighting system 100 are in the area 170 and the lighting devices of the lighting system 700 are in the area 730.

In general, the system 700 may be operated in the same manner as the system 100 where the primary difference between the systems is the type of communication (i.e., wireless or wired).

In some alternative embodiments, the controller 724 and/or the network device 726 may be omitted without departing from the scope of this disclosure. In some example embodiments, one or more lighting devices of the system 700 may communicate with the coordinator device 720 wirelessly instead of or in addition to communicating via a wired connection.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A configurable lighting system, comprising:
a coordinator device;
multiple lighting devices including a lighting device that is configured to transmit a wireless signal in response to a user input provided to the lighting device; and
a user device having a display interface, wherein the coordinator device is configured to identify one or more lighting devices from among the multiple lighting devices based on a power level of the wireless signal transmitted by the lighting device, based on one or more power levels of one or more wireless signals transmitted by the one or more lighting devices, and based on the one or more wireless signals each having a signal power level that is within a threshold range that is set relative to the power level of the wireless signal, wherein the user device is configured to display one or more visual display representations of the one or more lighting devices in response to the coordinator device indicating the one or more lighting devices to the user device, and wherein the visual display representation of a particular lighting device of the one or more lighting devices that is closest to the lighting device is indicated in the display interface as being closest to the lighting device.

2. The system of claim 1, wherein the user device is configured to display the one or more visual display representations of the one or more lighting devices in an order of differences between the one or more power levels of the one or more wireless signals transmitted by the one or more lighting devices and the power level of the wireless signal transmitted by the lighting device.

3. The system of claim 1, wherein the lighting device is configured to transmit the wireless signal in response to the user input provided to the lighting device.

4. The system of claim 3, wherein the user input is received by the lighting device via an integrated user input interface of the lighting device.

5. The system of claim 1, wherein the lighting device is a wall station.

6. The system of claim 5, wherein the one or more lighting devices include a motion sensor.

7. The system of claim 5, wherein the one or more lighting devices include one or more lighting fixtures.

8. The system of claim 1, wherein the multiple lighting devices operate in compliance with an energy code applied by the coordinator device.

9. The system of claim 1, wherein the user device is configured to associate the one or more visual display representations of the one or more lighting devices with a visual display representation of a zone of a physical area in response to a second input provided to the user device and wherein the lighting device is already associated with the zone of the physical area, and wherein the visual display representation of zone of the physical area is displayed on the display interface.

10. The system of claim 9, wherein the second user input includes commands to drag and drop the one or more visual display representations of the one or more lighting devices onto the visual display representation of the zone of the physical area and wherein the one or more lighting devices of the multiple lighting devices are associated with the zone of the physical area in response to the user device associating the one or more visual display representations of the one or more lighting devices with the visual display representation of the zone and the lighting device being already associated with the zone of the physical area.

11. A method of commissioning a lighting system, comprising:
identifying, by a coordinator device of a lighting system, multiple lighting devices based on a power level of a wireless signal transmitted by a lighting device, based on power levels of wireless signals transmitted by the multiple lighting devices, and based on the wireless signals each having a signal power level that is within a threshold range that is set relative to the power level of the wireless signal;
displaying, on a display interface of a user device, visual display representations of the multiple lighting devices in an order of differences between the signal power level of each wireless signal transmitted by the multiple lighting devices and the power level of the wireless signal transmitted by the lighting device, wherein the visual display representation of a particular lighting device of the multiple lighting devices that is closest to the lighting device is indicated on the display interface as being closest to the lighting device; and
associating, by the coordinator device, one or more lighting devices of the multiple lighting devices including the particular lighting device of the multiple lighting devices with a zone of a physical area in response to the user device associating visual display representations of the one or more lighting devices with a visual display representation of the zone.

12. The method of claim 11, further comprising associating, by the coordinator device, the one or more lighting devices with the lighting device in response to the user device associating the visual display representations of the one or more lighting devices with the visual display representation of the zone and wherein the lighting device is already associated with the zone before the one or more lighting devices are associated with the zone.

13. The method of claim 12, wherein the user device is configured to associate the visual display representations of the one or more lighting devices with the visual display representation of the zone in response to a user input provided to the user device.

14. The method of claim 13, wherein the user input includes commands to drag and drop the visual display representations of the one or more lighting devices onto the visual display representation of the zone of the physical area.

15. The method of claim 11, wherein the lighting device is configured to transmit the wireless signal in response to a user input provided to the lighting device.

16. The method of claim 15, wherein the user input is received by the lighting device via an integrated user input interface of the lighting device.

17. The method of claim 11, wherein the lighting device is a wall station.

18. The method of claim 17, wherein the multiple lighting devices include a motion sensor and one or more lighting fixtures.

19. The method of claim 11, further comprising creating, by the user device, the visual display representation of the zone of the physical area in response to a user input received by the user device to create the visual display representation of the physical area.

20. The method of claim 11, further comprising operating the lighting device and the multiple lighting devices in compliance with an energy code applied by the coordinator device.

* * * * *